US009519428B2

(12) United States Patent
Strauss et al.

(10) Patent No.: US 9,519,428 B2
(45) Date of Patent: Dec. 13, 2016

(54) DYNAMICALLY IMPROVING PERFORMANCE OF A HOST MEMORY CONTROLLER AND A MEMORY DEVICE

(71) Applicant: QUALCOMM Incorporated, San Diego, CA (US)

(72) Inventors: Nir Strauss, Maifa (IL); David Teb, Haifa (IL); Racheli Angel Manor, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 13/628,006

(22) Filed: Sep. 26, 2012

(65) Prior Publication Data

US 2014/0089610 A1 Mar. 27, 2014

(51) Int. Cl.
*G06F 12/00* (2006.01)
*G06F 3/06* (2006.01)

(52) U.S. Cl.
CPC ............... *G06F 3/061* (2013.01); *G06F 3/064* (2013.01); *G06F 3/0634* (2013.01); *G06F 3/0659* (2013.01); *G06F 3/0673* (2013.01)

(58) Field of Classification Search
None
See application file for complete search history.

(56) References Cited

U.S. PATENT DOCUMENTS 6,012,130 A * 1/2000 Beyda ....................... G06F 8/60 711/112
6,334,174 B1 12/2001 Delp et al.
6,678,812 B1 * 1/2004 Begis et al. .................. 711/171
6,853,938 B2 2/2005 Jeddeloh
6,944,084 B2 * 9/2005 Wilcox ......................... 365/226
6,973,603 B2 12/2005 Salmon et al.
7,366,866 B2 * 4/2008 Cochran et al. .............. 711/171
7,647,467 B1 1/2010 Hutsell et al.
2009/0222639 A1 * 9/2009 Hyvonen et al. ............ 711/170
2009/0300318 A1 12/2009 Allen et al.
2010/0281208 A1 * 11/2010 Yang ............................ 711/103
2010/0306417 A1 * 12/2010 Stephens et al. ................. 710/5
2011/0035540 A1 * 2/2011 Fitzgerald et al. ........... 711/103
2013/0024644 A1 * 1/2013 Givargis et al. .............. 711/203

OTHER PUBLICATIONS

JEDEC Standard, MultiMediaCard (MMC) Electrical Standard, High Capacity, MMCA version 4.2, Jul. 2007.*

* cited by examiner

*Primary Examiner* — Prasith Tammavong
*Assistant Examiner* — Jason Blust
(74) *Attorney, Agent, or Firm* — Howard Seo

(57) ABSTRACT

Methods, apparatuses, systems, and computer-readable media for dynamically improving performance of a host memory controller and a hosted memory device are presented. According to one or more aspects, a memory controller may establish a data connection with a memory device. The memory controller may perform a first write operation of a plurality of write operations to the memory device using a first block size. Subsequently, the memory controller may perform a second write operation of the plurality of write operations to the memory device using a second block size different from the first block size. The memory controller then may determine an optimal value for a block size parameter based at least in part on the plurality of write operations. Thereafter, the memory controller may use the optimal value for the block size parameter in performing one or more regular tasks involving the memory device.

36 Claims, 6 Drawing Sheets

610

| Byte Count | Write Throughput | Read Throughput | KB | Write Throughput2 | Read Throughput3 |
|---|---|---|---|---|---|
| 512 | 3054134.51 | 13004787.3 | 0.5 | 2.912649641 | 12.40233164 |
| 1024 | 11028355.07 | 22348167.09 | 1 | 10.51745898 | 21.31287297 |
| 2048 | 20817470.72 | 35812021.86 | 2 | 19.85308716 | 34.15300547 |
| 4096 | 42281290.32 | 52038511.17 | 4 | 40.32258064 | 49.62779157 |
| 8192 | 76260072.73 | 69304428.29 | 8 | 72.72727273 | 66.09385327 |
| 16384 | 76482567.47 | 76762518.3 | 16 | 72.93946025 | 73.20644217 |
| 32768 | 81856049.96 | 89545345.86 | 32 | 78.06401249 | 85.3970965 |

DYNAMICALLY IMPROVING PERFORMANCE OF A HOST MEMORY CONTROLLER AND A MEMORY DEVICE

BACKGROUND

Aspects of the disclosure relate to computing technologies. In particular, aspects of the disclosure relate to systems, methods, apparatuses, and computer-readable media for dynamically improving performance of a host memory controller and a memory device.

Currently, many computing devices, including mobile devices like smart phones and tablet computers, may be connectable to and/or otherwise compatible with different types of removable media devices, such as "thumb drives," memory cards, and/or the like, as well as various types of non-removable media devices. While these removable media devices and non-removable media devices typically implement and/or otherwise comply with one or more established standards, such as Secure Digital (SD), external Serial AT Attachment (eSATA), and Embedded MultiMediaCard (e-MMC), for instance, any given removable media device may nevertheless have unique properties that affect its performance characteristics, such as throughput, power usage, latency, and/or other performance characteristics. By implementing one or more aspects of the disclosure, improved performance, enhanced flexibility, and greater convenience may be achieved, for instance, in controlling and/or otherwise communicating with a memory device, such as a removable media device.

SUMMARY

Increasingly, computing devices include interfaces that support various portable memory devices, such as flash memory devices. While these computing devices may include a memory controller that implements various standards to communicate with different memory devices, a particular memory device may have unique properties and/or behaviors beyond the functions defined by the particular memory standard that it implements, and this information may be unknown to a memory controller hosting the memory device. For example, a memory controller might lack information about a memory device's internal buffer sizes, data management schemes, dynamic power usage schemes, and/or the like. These properties of the memory device, however, may impact system performance during data operations coordinated by the memory controller, such as read and write operations. Aspects of the disclosure provide ways of allowing a memory controller to dynamically collect information about a hosted memory device so as to optimize how the host memory controller communicates with and/or otherwise uses the memory device.

In one example, a memory controller may establish a data connection with a memory device, and the memory device may adhere to a common standard (e.g., Secure Digital (SD), Embedded MultiMediaCard (e-MMC), Serial Advanced Technology Attachment (SATA), etc.) as the memory controller. Subsequently, the memory controller may vary at least one parameter within one or more confines defined by the standard. For instance, the memory controller may perform a plurality of write operations to the memory device, and each write operation of the plurality of write operations may have a different block size than the other write operations. Thereafter, the memory controller may determine an optimal value for the at least one parameter based at least in part on the varying. The memory controller then may use the optimal value for the at least one parameter in performing regular tasks (e.g., read and write operations) involving the memory device.

More particularly, according to one or more aspects of the disclosure, a memory controller may establish a data connection with a memory device, and the memory device may adhere to a common standard as the memory controller. Subsequently, the memory controller may perform a first write operation of a plurality of write operations to the memory device using a first block size. The memory controller then may perform a second write operation of the plurality of write operations to the memory device using a second block size different from the first block size. Then, the memory controller may determine an optimal value for a block size parameter (e.g., to be used with the memory device) based at least in part on the plurality of write operations. Thereafter, the memory controller may use the optimal value for the block size parameter in performing one or more regular tasks involving the memory device.

Because aspects of the disclosure generally involve evaluating and optimizing parameters of a connection between a memory controller and a memory device at a software-level (such as the block size used in performing write and/or read operations on a memory device), instead of varying and evaluating parameters at a hardware-level (which might be difficult to vary without hardware modification, or might not be possible to vary because of specifications defined by the relevant standard), the techniques discussed herein are more flexibly applied to different memory controllers and memory devices, since these software-level parameters may be controlled by software that is easily deployed and updated, without requiring extensive, if any, modifications to existing hardware.

According to one or more additional and/or alternative aspects, determining an optimal value for the block size parameter may be further based at least in part on a plurality of time values corresponding to the plurality of write operations, and each time value of the plurality of time values may represent an amount of time elapsed in completing a corresponding write operation. In at least one additional arrangement, a block size used in the write operation corresponding to the smallest time value may be selected as the optimal value for the block size parameter.

In one or more additional and/or alternative arrangements, an amount of power consumption for each of the plurality of write operations may be estimated, and a block size used in the write operation corresponding to the lowest amount of power consumption may be selected as the optimal value for the block size parameter.

In still one or more additional and/or alternative arrangements, a first optimal value may be determined for a first mode of operation defined by the standard, and a second optimal value may be determined for a second mode of operation defined by the standard, where the second mode is different from the first mode.

BRIEF DESCRIPTION OF THE DRAWINGS

Aspects of the disclosure are illustrated by way of example. In the accompanying figures, like reference numbers indicate similar elements, and.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Figure 1:
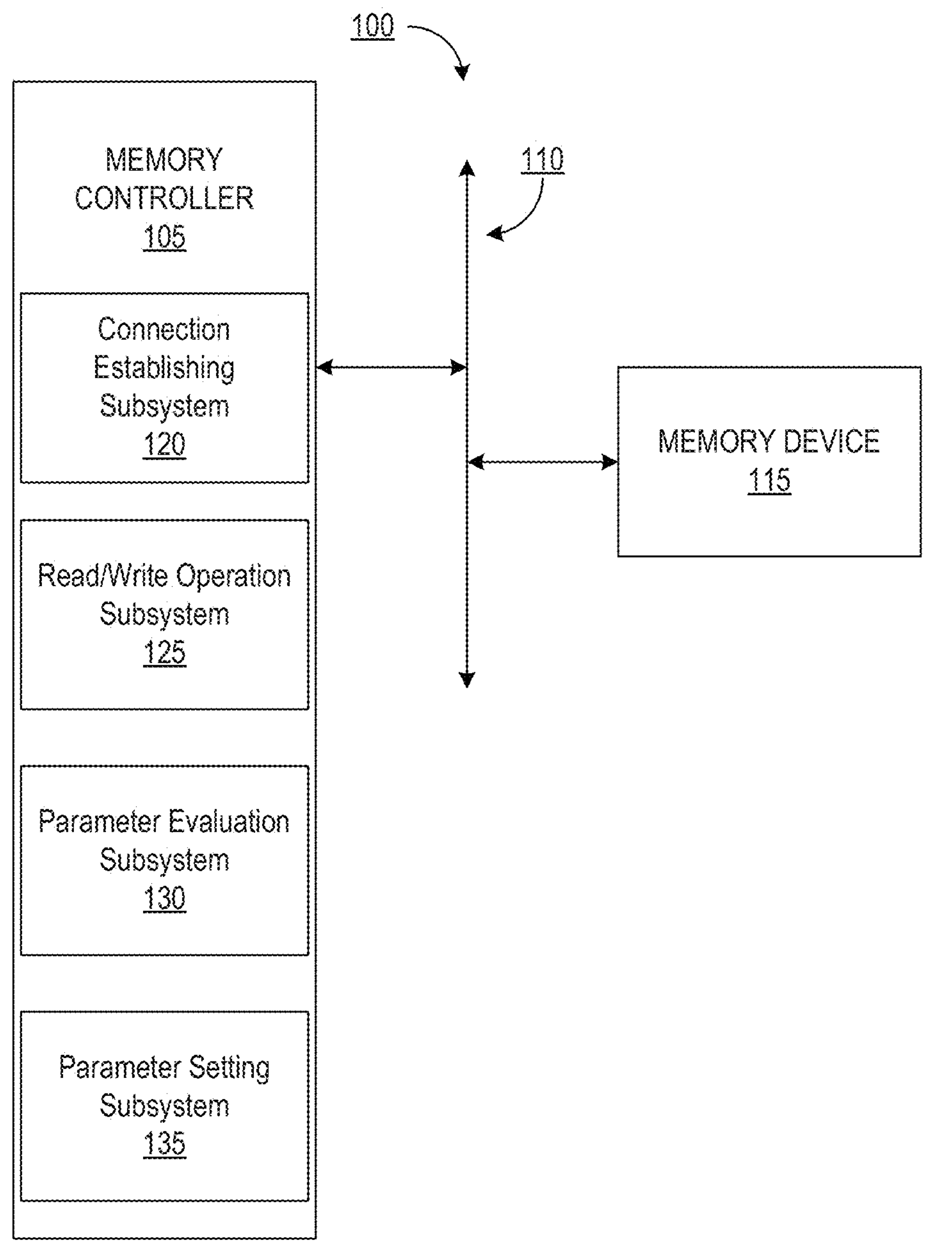
FIG. 1 illustrates an example system in which one or more illustrative aspects of the disclosure may be implemented.

FIG. 1 illustrates an example system 100 in which one or more aspects of the disclosure may be implemented. In particular, system 100 may include a memory controller 105, a bus 110, and a memory device 115. In at least one arrangement, memory controller 105 may be a component in a larger computing device, which in turn may include a processor and/or memory unit that operates to control memory controller 105. For example, memory controller 105 may be a component in a computing system, such as the example computing system illustrated in FIG. 7 and described in greater detail below. Additionally, memory controller 105 may communicate with and/or otherwise control memory device 115 via bus 110, which may allow memory controller 105 to send and receive electrical signals to and from memory device 115. In one or more arrangements, memory device 115 may be a portable and/or detachable memory device, such as a memory card, thumb drive, and/or the like. In other arrangements, memory device 115 may be a non-detachable memory device, such as a memory card soldered on to a circuit board included in system 100. In one or more additional and/or alternative arrangements, memory controller 105 may be a software module provided by a processor and/or memory unit of a larger computing device.

In some embodiments, memory controller 105 may include a number of subsystems that can be implemented in software, hardware, or combinations thereof. Any and/or all of these subsystems may operate to provide the various features and functionalities of a memory controller that are discussed herein. For example, memory controller 105 may include a connection establishing subsystem 120, a read-write operation subsystem 125, a parameter evaluation subsystem 130, and a parameter setting subsystem 135. One or more communication paths may be provided that enable the one or more subsystems to communicate with and exchange data with each other. In addition, memory controller 105 may, in some embodiments, include other subsystems than those shown in FIG. 1, and in other embodiments, may combine subsystems or have a different configuration or arrangement of subsystems.

In some embodiments, connection establishing subsystem 120 may enable memory controller 105 to establish a data connection with a memory device, such as memory device 115. Such a data connection may, for instance, enable the memory controller 105 to read information from, write information to, and/or otherwise exchange information with a memory device, such as memory device 115.

In some embodiments, read-write operation subsystem 125 may, for example, enable memory controller 105 to perform a plurality of read operations and/or write operations on a memory device, such as memory device 115. In some instances, at least one read operation and/or write operation of the plurality of read operations and/or write operations may have a different block size than one or more other read operations and/or write operations of the plurality of read operations and/or write operations. This may allow memory controller 105 to determine optimal value(s) for parameter(s) associated with a memory device, as discussed in greater detail below.

In some embodiments, parameter evaluation subsystem 130 may enable memory controller 105 to determine an optimal value for a parameter associated with a memory device, such as memory device 115. For example, parameter evaluation subsystem 130 may enable memory controller 105 to determine an optimal value for a block size parameter, based on a plurality of read operations and/or a plurality of write operations that are performed on a memory device, such as read operations and/or write operations that are performed on memory device 115 by read-write operation subsystem 125 of memory controller 105.

In some embodiments, parameter setting subsystem 135 may enable memory controller 105 to use an optimal value for the parameter associated with the memory device in performing regular operations on the memory device. For example, parameter setting subsystem 135 may enable memory controller 105 to use an optimal value for the block size parameter (e.g., as may be determined by parameter evaluation subsystem 130) in performing one or more regular tasks involving the memory device, such as in performing read and/or write operations on memory device 115.

Figure 2:
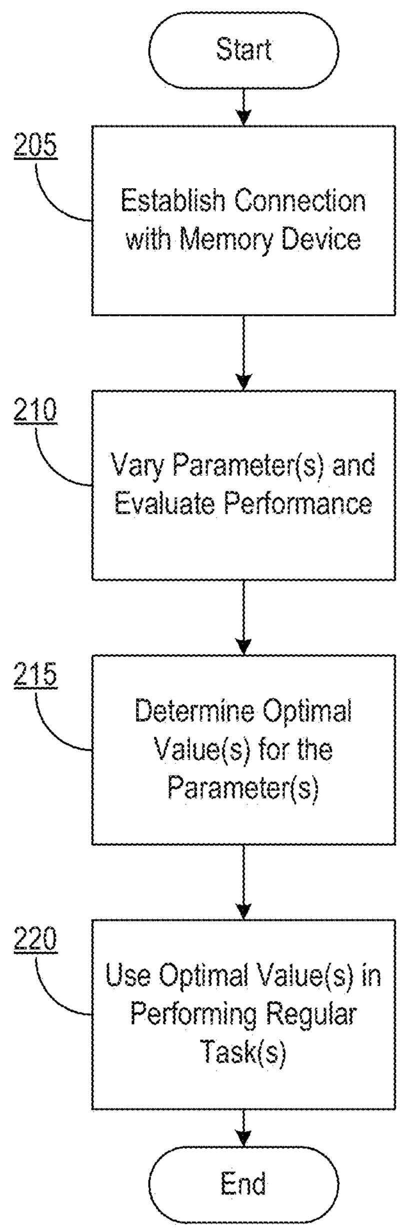
FIG. 2 illustrates an example method of determining at least one optimal value for one or more parameters associated with a memory device according to one or more illustrative aspects of the disclosure.

FIG. 2 illustrates an example method of determining at least one optimal value for one or more parameters associated with a memory device according to one or more aspects of the disclosure. In step 205, memory controller 105 may establish a connection with a memory device, such as memory device 115. For example, both memory controller 105 and memory device 115 may implement a particular communication standard, such as SD, and the connection may be established in accordance with the specifications of the standard.

Subsequently, in step 210, memory controller 105 may vary one or more parameters within the confines of the standard so as to evaluate the performance of the memory device 115. For example, memory controller 105 may perform a sweep of write transactions on the memory device 115 in which a constant amount of data is written to the memory device 115 in each of the transactions, but the block size is varied within the minimum and maximum sizes allowed by the standard. Additionally, in performing each of the write transactions in the sweep, the memory controller 105 may measure the amount of time elapsed in completing each write transaction, as this may allow the memory controller 105 to calculate and/or determine how the performance of the memory device 115 correlates with the different block sizes (e.g., in terms of time, data throughput, power consumption, mode, etc.).

While performing a sweep of write transactions is used as an example here, in some embodiments, varying one or more parameters within the confines of a standard may include performing a sweep of read transactions in which a constant amount of data is read from the memory device 115 in each transaction, but the block size is varied within the minimum and maximum sizes allowed by the standard. The memory controller 105 then may similarly evaluate performance of the memory device 115 based on the amount of time elapsed in completing each read transaction. In other embodiments, varying one or more parameters within the confines of a standard may include performing a sweep of read and write transactions, and subsequently evaluating performance of the memory device 115 in a similar manner as described above. Thus, both read and write operations may be optimized, and the block sizes and/or other settings used for read operations and write operations may be different, based on the host controller, memory device, and/or other system architecture.

Referring again to FIG. 2, in step 215, memory controller 105 may determine one or more optimal values for the one or more parameters. For example, using the time values measured during the sweep of write transactions, memory controller 105 may determine which block size provides optimal performance. In some instances, memory controller 105 may determine that a particular block size is the optimal block size based at least in part on the particular block size corresponding to the shortest time measured (e.g., for the corresponding write transaction) during the sweep. In other instances, memory controller 105 may estimate an amount of power consumption for each of the plurality of block sizes (e.g., based at least in part on the times measured during the sweep), and subsequently determine that a particular block size is the optimal block size based at least in part on the particular block size corresponding to the lowest power consumption (e.g., for the corresponding write transaction) during the sweep. In additional and/or alternative arrangements, a user may set preferences specifying whether to optimize based at least in part on time or data throughput, power consumption, mode, and/or other factors, and memory controller 105 may take these user preferences into account when determining the optimal block size. Furthermore, in instances where both memory controller 105 and memory device 115 support a plurality of different modes (e.g., various modes of a particular standard), memory controller 105 may determine that a first parameter value (e.g., a first block size) is optimal for use in a first mode, while a second parameter value (e.g., a second block size) is optimal for use in a second mode different from the first mode.

Finally, in step 220, memory controller 105 may use the one or more optimal values in performing one or more regular tasks involving the memory device. For example, having determined an optimal block size to be used with the memory device 115, memory controller 105 may subsequently use the optimal block size in performing write operations to the memory device 115.

As discussed above, according to one or more aspects of the disclosure, at least one parameter that may be optimized to enhance the performance of a memory controller and/or a memory device is the block size used in performing write transactions to the memory device. An example method illustrating how such a block size may be optimized will now be described in greater detail with respect to FIG. 3.

Figure 3:
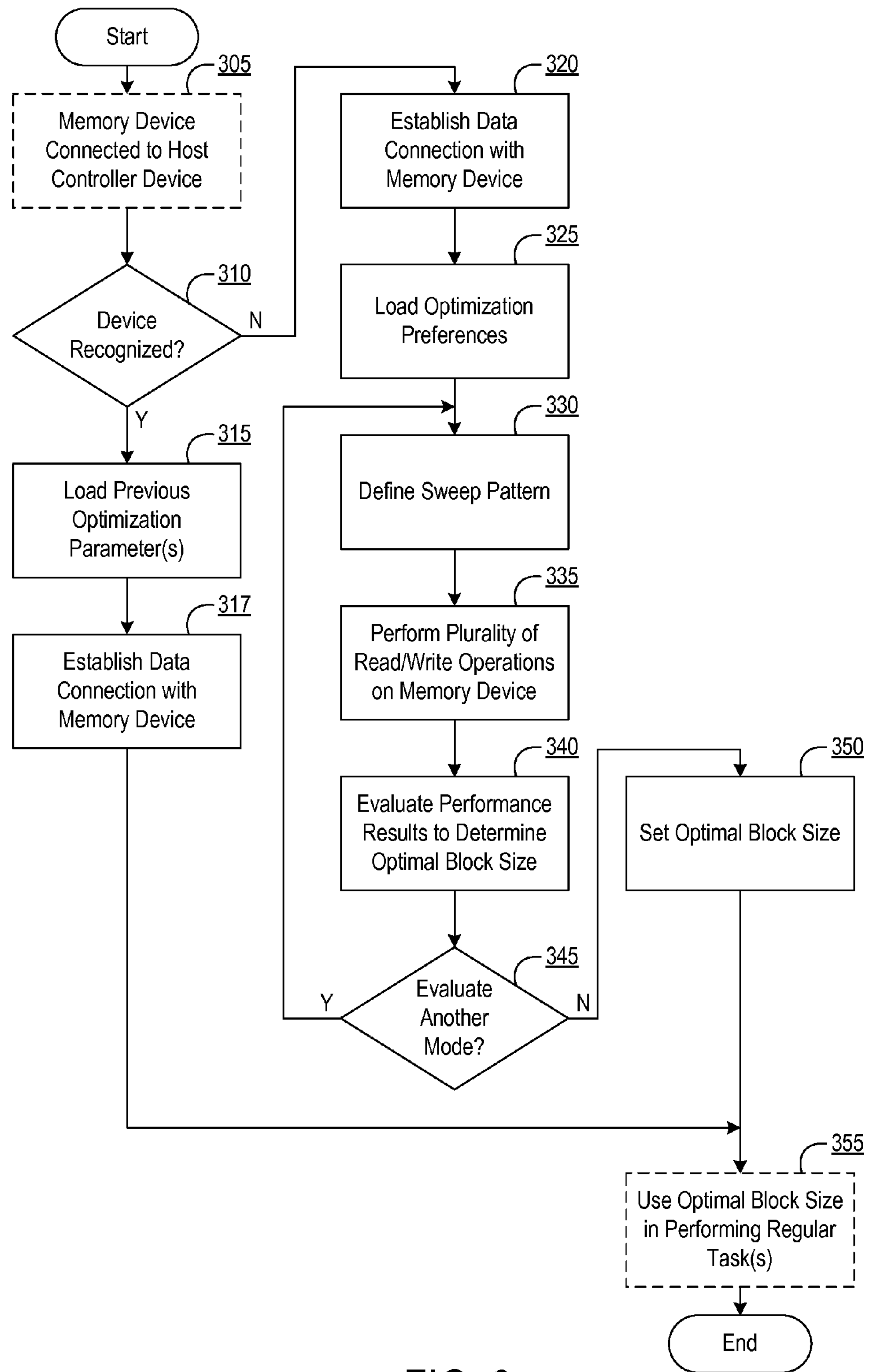
FIG. 3 illustrates an example method of dynamically improving performance of a host memory controller and a hosted memory device according to one or more illustrative aspects of the disclosure.

FIG. 3 illustrates an example method of dynamically improving performance of a host memory controller and a hosted memory device according to one or more aspects of the disclosure. According to one or more aspects, any and/or all of the methods and/or method steps described herein may be performed by a memory controller and/or a computing device, such as the example computer 700 described in greater detail below. Additionally or alternatively, any and/or all of the methods and/or method steps described herein may be embodied in one or more computer-readable media as computer-executable instructions.

In step 305, a memory device may be connected to a host memory controller device. For example, in step 305, a user may insert, attach, or otherwise connect a memory device 115 (e.g., an SD card, a removable USB drive, etc.) to a computing device that includes and/or implements a memory controller 105. Example types of memory devices that could be inserted into, attached to, and/or otherwise connected to the computing device and/or the memory controller include memory devices implementing one or more of eMMC, SD, raw NAND, and SATA technologies, and/or their derivatives. Additionally or alternatively, such devices may be in the form of a card, stick, or other physical arrangement, as may be desired.

Subsequently, in step 310, the memory controller may determine whether the memory device is recognized (e.g., by the memory controller). For example, in step 310, memory controller 105 may determine whether memory device 115 is recognized based on whether memory device 115 has previously been connected to memory controller 105, whether memory controller 105 has previously determined one or more optimization parameters for memory device 115, and/or whether memory controller 105 has stored information about one or more optimization parameters for memory device 115.

If the memory controller determines, in step 310, that the memory device is recognized, then in step 315, the memory controller may load one or more previously determined optimization parameters. For example, in step 315, if the memory device 115 is recognized by the memory controller 105, then the memory controller 105 may load one or more previously determined optimization parameters for use with the memory device 115. As described in greater detail below, in one or more arrangements, the one or more previously determined optimization parameters may include an optimal block size to be used in performing write and/or read operations on the memory device 115. Additionally or alternatively, the one or more previously determined optimization parameters may include a number of optimal block sizes to be used in performing write and/or read operations on the memory device 115 in a plurality of different modes. The memory controller then may establish a data connection with the memory device, in step 317, and in at least one arrangement, the memory controller may establish this data connection with the memory device based on the one or more previously determined optimization parameters.

On the other hand, if the memory controller determines, in step 310, that the memory device is not recognized, then in step 320, the memory controller may establish a data connection with the memory device (e.g., based on one or more default parameters that may be stored by the memory controller and/or defined by the standard used to establish the connection between the memory controller and the memory device).

Subsequently, in step 325, the memory controller may load one or more optimization preferences. According to one or more aspects, such optimization preferences may specify which properties are to be prioritized and/or maximized to achieve the desired type of optimized performance. For example, the optimization preferences may specify that data throughput is to be maximized and the time used to write an amount of data to the memory device is to be minimized. Additionally or alternatively, the optimization preferences may specify that power consumption is to be minimized. In one or more arrangements, the optimization preferences may be preset for the memory controller (or a computing system that implements and/or includes the memory controller) and/or may be created and/or modified by a user of the memory controller (or the computing system).

In step 330, the memory controller may define a sweep pattern, and in at least one arrangement, the sweep pattern may be defined based on the one or more optimization preferences (e.g., the one or more optimization preferences loaded in step 325). For example, in step 330, the memory controller 105 may create and/or generate a pattern of varying data block sizes to be used in evaluating and optimizing performance of the memory device 115. Such optimization may, for instance, address the specific host implementation of the memory controller 105 in evaluating performance of the memory device 115. In some arrangements, the memory controller may create and/or generate the pattern based on one or more predefined patterns stored by the memory controller (or the computing system that implements and/or includes the memory controller), while in other arrangements, the memory controller may additionally or alternatively create and/or generate the pattern based on one or more algorithms (e.g., executed by the memory controller and/or the computing system using one or more of the optimization parameters). In one or more arrangements, the particular features of the pattern created and/or generated by the memory controller may further be dictated by or otherwise depend on the standard used to establish the connection between the memory controller and the memory device, one or more modes (e.g., one or more modes of the standard used to establish connection) that are to be used in communications between the memory controller and the memory device, and/or other factors.

Subsequently, in step 335, the memory controller may perform a plurality of read and/or write operations on the memory device (e.g., in accordance with the sweep pattern defined in step 330). For example, in step 335, memory controller 105 may perform a plurality of write operations to the memory device 115 using varying block sizes based on the previously created and/or generated pattern. In performing the plurality of write operations to the memory device 115, memory controller 105 (and/or the computing system that implements and/or includes the memory controller 105) may measure and record the amount of time it takes to complete each write operation (e.g., in seconds, milliseconds, etc.) in association with the block size used for the particular write operation, as this information may enable the memory controller 105 (and/or the computing device) to evaluate how the memory controller performs when particular block sizes are used (e.g., to determine which block size resulted in the fastest write operation). In at least one arrangement, the plurality of write operations may include two or more write operations having the same block size. In such an arrangement, the time values representing the completion times for the two or more write operations may be averaged (e.g., by the memory controller and/or the computing device) so that these time values can be compared to completion times of other write operations involving different block sizes.

While performing a sweep of write transactions is discussed in the example above, in other arrangements, memory controller 105 may likewise perform a plurality of read (or read and write) operations to the memory device 115 using varying block sizes based on the previously created and/or generated pattern. As in the example discussed above, in performing the plurality of read operations (or read and write operations) to the memory device 115, memory controller 105 (and/or the computing system that implements and/or includes the memory controller 105) may measure and record the amount of time it takes to complete each read operation (e.g., in seconds, milliseconds, etc.), or read and write operation, in association with the block size used for the particular operation, as this information may enable the memory controller 105 (and/or the computing device) to evaluate how the memory controller performs when particular block sizes are used (e.g., to determine which block size resulted in the fastest read or read and write operations). Similarly, in some instances, the plurality of read operations and/or read and write operations may include two or more operations having the same block size, and in these instances, the time values representing the completing times for such operations may be averaged for purposes of comparison with operations involving other block sizes.

In step 340, the memory controller may evaluate the performance results for the various block sizes used in performing the plurality of write operations in order to determine an optimal block size (e.g., to use in performing future write and/or read operations on the memory device). For example, in step 340, memory controller 105 may determine, based on the time values measured and recorded for completing the plurality of write operations (e.g., in step 335), which block size produced the fastest write operation (e.g., the write operation having the shortest completion time), as such a block size may be determined to be the optimal block size in one or more arrangements.

Additionally or alternatively, evaluating the performance results to determine the optimal block size may be further based on optimization preferences (e.g., the one or more optimization preferences loaded in step 325). For example, instead of simply determining that the optimal block size is the block size which produced the fastest write operation, memory controller 105 (and/or the computing system that implements the memory controller) may evaluate the time values measured and recorded for completing the plurality of write operations to optimize the parameter(s) prioritized in the optimization preferences. If, for instance, the optimization preferences prioritize power conservation (e.g., by specifying that power consumption is to be minimized), then the memory controller 105 (and/or the computing system) may determine that the optimal block size to be used is the block size which produced the most power-efficient write operation. As an example, the memory controller 105 (and/or the computing system) may determine which block size produced the most power-efficient write operation using a mathematical function or algorithm that defines a mathematical relationship (e.g., linear, polynomial, etc.) between a time value representing the completion time of a write operation and an amount of electrical power consumed during the write operation (e.g., in watt-hours, ampere-hours, etc.). In one or more arrangements, the memory controller 105 (and/or the computing system) may select, from a plurality of power usage functions and/or algorithms, a particular function or algorithm to use in determining power consumption based on the standard used to establish the connection between the memory controller 105 and the memory device 115, various characteristics and/or properties of the memory controller 105 and/or the memory device 115 (e.g., the manufacturer of the memory controller 105, the manufacturer of the memory device 115, the model number of the memory controller 105, the model number of the memory device 115, etc.), and/or other information.

For example, in some instances, system 100 and/or memory controller 105 may estimate an amount of power consumed by the memory device 115 based on information associated with the specification of the standard implemented by the memory device 115, such as the specification associated with the SD standard or the eMMC standard. In some arrangements, system 100 and/or memory controller 105 may estimate the amount of power consumed by the memory device 115 using the following generally accepted formula:

$$\text{Power}=\text{ActivityFactor}\times\text{IOFrequency}\times\text{EstimatedCapacitance}\times\text{VoltageSwing}\times V_{dd}$$

In the formula shown above, the "ActivityFactor" value may represent the bit rate or the change in bit rate (e.g., as based on the particular block size used in a read/write operation being evaluated). The "IOFrequency" value may, for instance, represent the clock signal used with the memory device 115. The "EstimatedCapacitance" value may represent the PCB (Printed Circuit Board) trace capacitance (e.g., for the memory device 115, the memory controller 105, and/or the circuit that includes the memory device 115 and the memory controller 105). The "VoltageSwing" value may represent the voltage swing (e.g., for the memory device 115, the memory controller 105, and/or the circuit that includes the memory device 115 and the memory controller 105). The "$V_{dd}$" value may represent the reference voltage (e.g., for the memory device 115, the memory controller 105, and/or the circuit that includes the memory device 115 and the memory controller 105). In some embodiments, the reference voltage may be between 2.8 Volts (V) and 3.8 V, or may be 1.8 V. The reference voltage may have a different value in other embodiments. Using a power value calculated with this formula, the total power consumption for a particular read/write operation then may be obtained by multiplying the calculated power value by the amount of time elapsed during the particular read/write operation (e.g., as measured during the sweep for the particular read/write operation being evaluated). In one example, power consumption thus may be reduced by running the circuit and/or the memory controller 105 at a lower clock rate, for instance.

Referring again to FIG. 3, in step 345, it may be determined whether another mode (e.g., another mode of the standard used to establish the connection between the memory controller and the memory device) is to be similarly evaluated and optimized. For example, if the standard used to establish the connection between memory controller 105 and memory device 115 supports another mode that has not yet been evaluated and optimized, then memory controller 105 (and/or the computing system implementing the memory controller) may determine to evaluate the additional mode by repeating steps 330, 335, and 340 in the additional mode. (If there are multiple modes that have yet to be evaluated and optimized, then memory controller 105 may repeat this loop until all modes have been evaluated and optimized.) In at least one arrangement, determining whether another mode is to be evaluated and optimized may be further based on optimization preferences (e.g., the one or more optimization preferences loaded in step 325), as these optimization preferences may specify that one or more modes of a standard are to be prioritized, that only one particular mode is to be used, and/or the like.

If it is determined in step 345 that another mode is not to be evaluated and optimized, then in step 350, the memory controller may set an optimal block size (e.g., based on the evaluation and/or determination made in step 350). For example, memory controller 105 may store in one or more registers, the block size determined to be optimal in step 350 in order to set this block size as the optimal block size. In another example, where the memory controller evaluated block sizes using a plurality of different modes, memory controller 105 may store, in one or more registers, both the block size and the mode that produced the fastest write operation (and/or otherwise best maximized the optimization preferences) as the optimal block size and the optimal mode.

Thereafter, in step 355, the memory controller may use the optimal block size in performing one or more regular tasks. For example, memory controller 105 may use the optimal block size (and, in some instances, the optimal mode) in performing one or more regular tasks with the memory device 115, such as one or more regular (e.g., non-evaluative) read and/or write operations on the memory device 115.

Figure 4:
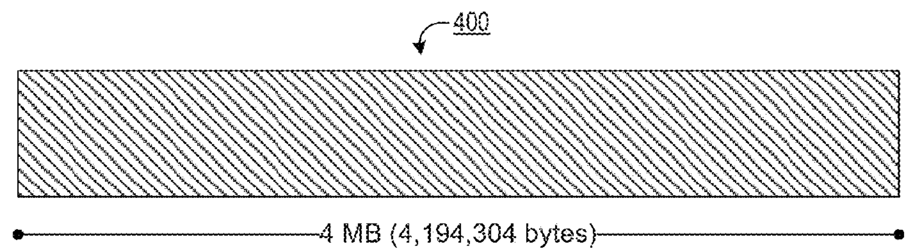
FIG. 4 illustrates an example of test data that may be used in determining an optimal block size for a hosted memory device according to one or more illustrative aspects of the disclosure.

FIG. 4 illustrates an example of test data that may be used in determining an optimal block size for a hosted memory device according to one or more aspects of the disclosure. In particular, FIG. 4 illustrates a constant amount of data 400 that can be divided up into data blocks of different sizes in performing different iterations of a sweep of write operations on a memory device, as described above. For example, in some instances, the four megabyte block of data 400 may divided up into data blocks that each include 512 bytes of data, while in other instances, the four megabyte block of data 400 might be divided up into data blocks that each include 1024 or 2048 bytes of data. While these data block sizes are discussed here as examples, in one or more arrangements, other block sizes could be used instead of and/or in addition to those discussed here.

Figure 5:
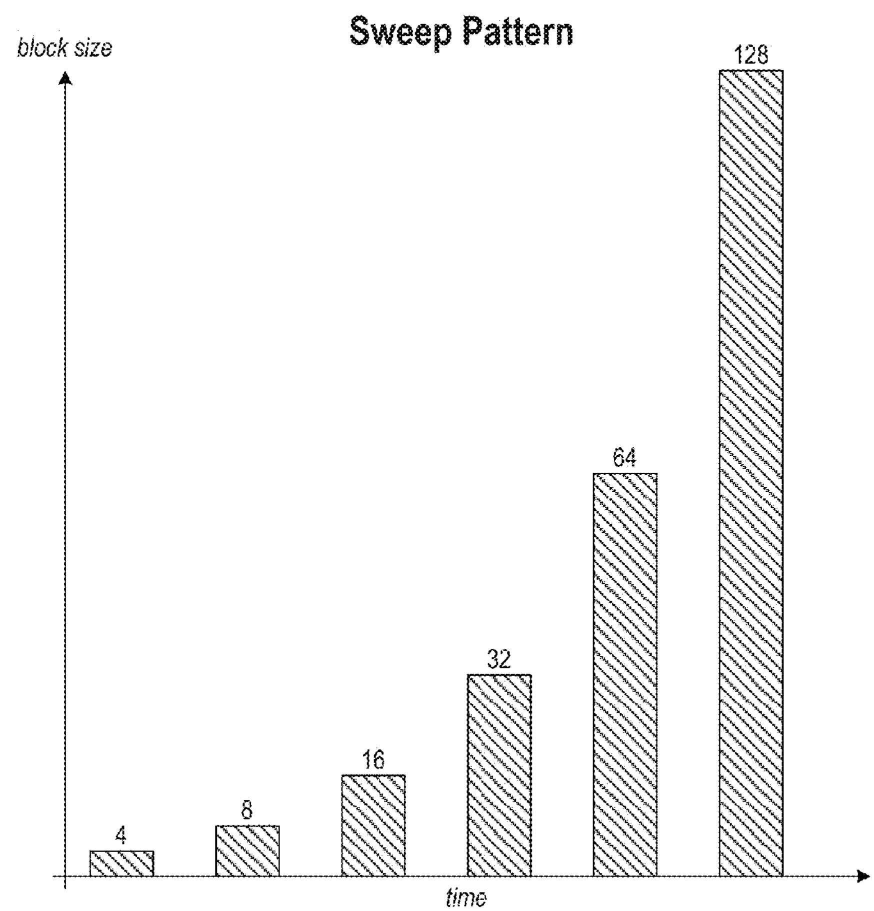
FIG. 5 illustrates an example of a sweep pattern that may be used in performing a plurality of write operations to a memory device according to one or more illustrative aspects of the disclosure.

FIG. 5 illustrates an example of a sweep pattern that may be used in performing a plurality of write operations to a memory device according to one or more aspects of the disclosure. For example, as seen in FIG. 5, a pattern of write operations may be defined to occur over a period of time, and during the period of time, the block size used in performing the write operations may vary. In the example pattern illustrated in FIG. 5, for instance, a block size of four bytes may initially be used in performing one or more write operations on a memory device. Subsequently, in this example, the block size may be increased, and a block size of eight bytes may then be used in performing one or more write operations on the memory device. The block size may continue to be increased, and evaluative write operations may continue to be performed, until a number of time values have been measured in performing the plurality of write operations (e.g., so as to facilitate the evaluation discussed above with respect to FIG. 3). While these increasing block sizes are discussed here and illustrated in FIG. 5 as examples, in one or more arrangements, other block sizes and/or patterns could be used instead of and/or in addition to those discussed here. For example, in some instances, a particular protocol or standard may have a predefined amount of granularity in block size, and the block size may be varied in different operations based on this predefined amount of granularity.

Figure 6:
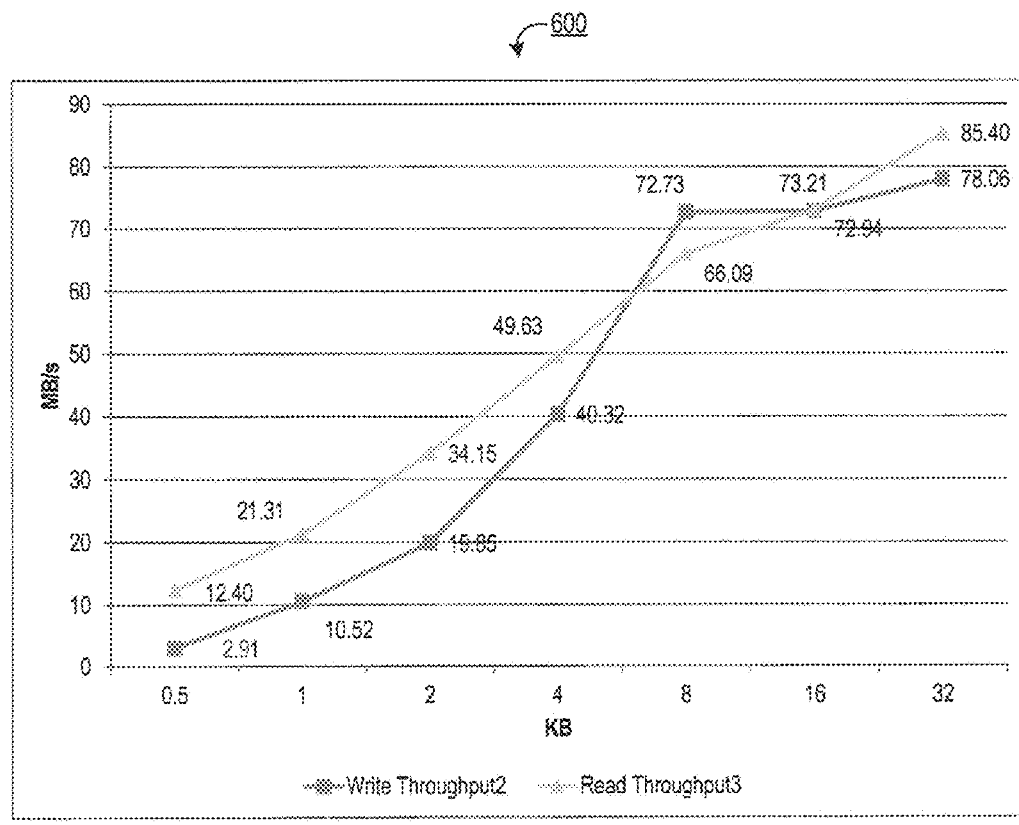
FIG. 6 illustrates an example of performance results that may be obtained according to one or more illustrative aspects of the disclosure.

FIG. 6 illustrates an example of performance results that may be obtained according to one or more illustrative aspects of the disclosure. In particular, in the example shown in FIG. 6, the illustrated performance results may represent values measured with respect to a SATA interface. As seen in graph 600 and table 610 of FIG. 6, by varying a block size used in read operations and write operations, different amounts of throughput may be achieved, and an optimal amount of throughput may be selected for use in future operations (e.g., as discussed above). As also seen in graph 600 and table 610, the optimal block size for write transactions may be different from the optimal block size for read transactions. Accordingly, system 100 and/or memory controller 105 may determine and/or select a first block size as the optimal block size for use in write operations, and system 100 and/or memory controller 105 may determine and/or select a second block size, different from the first block size, as the optimal block size for use in read operations.

Figure 7:
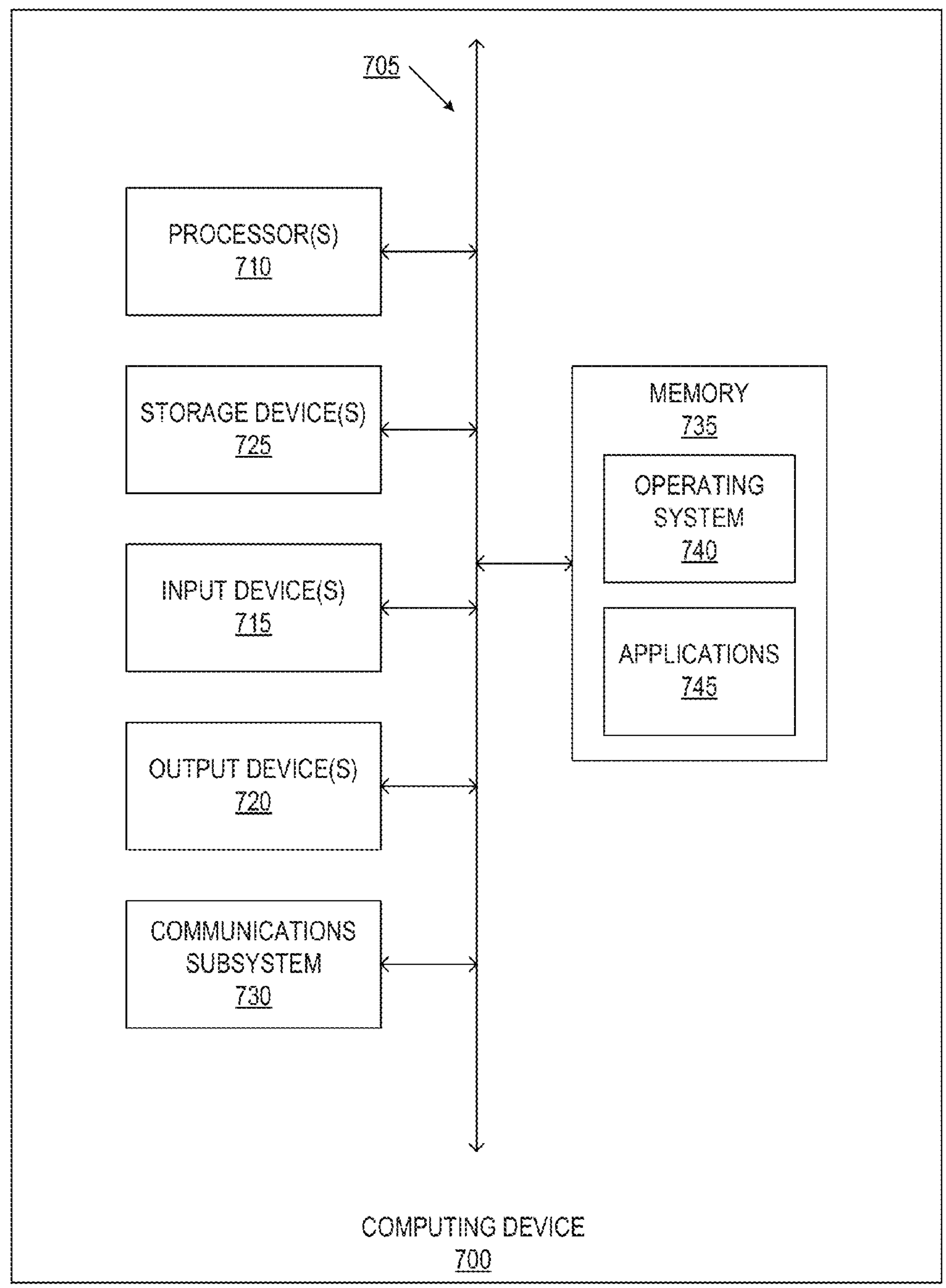
FIG. 7 illustrates an example computing system in which one or more illustrative aspects of the disclosure may be implemented.

Having described multiple aspects of dynamically improving performance of a host memory controller and a hosted memory device, an example of a computing system in which various aspects of the disclosure may be implemented will now be described with respect to FIG. 7. According to one or more aspects, a computer system as illustrated in FIG. 7 may be incorporated as part of a computing device, which may implement, perform, and/or execute any and/or all of the features, methods, and/or method steps described herein. For example, computer system 700 may represent some of the components of a hand-held device. A hand-held device may be any computing device with an input sensory unit, such as a camera and/or a display unit. Examples of a hand-held device include but are not limited to video game consoles, tablets, smart phones, and mobile devices. In one embodiment, the computer system 700 is configured to implement the system 100 described above. FIG. 7 provides a schematic illustration of one embodiment of a computer system 700 that can perform the methods provided by various other embodiments, as described herein, and/or can function as the host computer system, a remote kiosk/terminal, a point-of-sale device, a mobile device, a set-top box, and/or a computer system. FIG. 7 is meant only to provide a generalized illustration of various components, any and/or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, and/or the like); one or more input devices 715, which can include without limitation a camera, a mouse, a keyboard and/or the like; and one or more output devices 720, which can include without limitation a display unit, a printer and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 700 might also include a communications subsystem 730, which can include without limitation a modem, a network card (wireless or wired), an infrared communication device, a wireless communication device and/or chipset (such as a communication device sold under the trademark Bluetooth®, an 802.11 device, a communication device sold under the trademark WiFi®, a communication device sold under the trademark WiMax®, cellular communication facilities, etc.), and/or the like. The communications subsystem 730 may permit data to be exchanged with a network (such as the network described below, to name one example), other computer systems, and/or any other devices described herein. In many embodiments, the computer system 700 will further comprise a non-transitory working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above, for example as described with respect to FIG. 2 and/or FIG. 3, might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 700) to perform methods in accordance with the disclosure. For example, some or all of the procedures of the described methods may be performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein, for example a method described with respect to FIG. 2 and/or FIG. 3.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 725. Volatile media include, without limitation, dynamic memory, such as the working memory 735. Transmission media include, without limitation, coaxial cables, copper wire and fiber optics, including the wires that comprise the bus 705, as well as the various components of the communications subsystem 730 (and/or the media by which the communications subsystem 730 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700. These signals, which might be in the form of electromagnetic signals, acoustic signals, optical signals and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A method comprising:

establishing, by a memory controller, a data connection with a memory device, the memory device adhering to a common standard as the memory controller;

determining, by the memory controller, whether the memory device is recognized or not and, upon determining that the memory device is not recognized:

(i) performing, by the memory controller, a first write operation of a plurality of write operations to the memory device using a first block size;

(ii) performing, by the memory controller, a second write operation of the plurality of write operations to the memory device using a second block size different from the first block size, wherein the first block size and the second block size are included in a sweep pattern of different block sizes, the sweep pattern determined based on at least one of: (a) the standard or (b) one or more modes of the standard;

(iii) determining, by the memory controller, an optimal value for a block size parameter associated with the memory device based at least in part on the plurality of write operations; and (iv) storing, by the memory controller, the optimal value for the block size parameter associated with the memory device, the stored optimal value associated with the memory device retrievable upon recognition of the memory device; and using, by the memory controller, a stored optimal value for a block size parameter associated with the memory device in performing one or more regular tasks involving the memory device, wherein a first optimal value is determined for a first mode of operation defined by the standard, and wherein a second optimal value is determined for a second mode of operation defined by the standard, the second mode being different from the first mode.

2. The method of claim 1, wherein determining an optimal value for the block size parameter is further based at least in part on a plurality of time values corresponding to the plurality of write operations, each time value of the plurality of time values representing an amount of time elapsed in completing a corresponding write operation.

3. The method of claim 2, wherein a block size used in the write operation corresponding to the smallest time value is selected as the optimal value for the block size parameter.

4. The method of claim 2, further comprising:

estimating an amount of power consumption for each of the plurality of write operations, wherein a block size used in the write operation corresponding to the lowest amount of power consumption is selected as the optimal value for the block size parameter.

5. The method of claim 1, wherein the standard is SD (Secure Digital).

6. The method of claim 1, wherein the standard is e-MMC (Embedded MultiMediaCard).

7. The method of claim 1, wherein the standard is SATA (Serial Advanced Technology Attachment).

8. The method of claim 1, further comprising:

obtaining, by the memory controller, one or more optimization preferences for specifying which properties are to be prioritized or maximized to achieve at least one desired type of optimized performance; and performing the determining, by the memory controller, of the optimal value for the block size parameter, based on the one or more optimization preferences.

9. The method of claim 1, further comprising, upon determining that the memory device is recognized, retrieving a stored optimal value for a block size parameter from a plurality of stored block size parameters, the optimal value associated with the memory device.

10. The method of claim 1, further comprising:

determining, by the memory controller, whether the memory device is to be communicated with via a mode of the standard, wherein the determining whether the memory device is recognized includes determining whether the device is recognized for communication with via the mode of the standard;

associating the optimal value with the memory device and the mode of the standard; and wherein the storing the optimal value for the block size parameter includes storing the optimal value associated with the memory device and the mode of the standard.

11. The method of claim 10, wherein the using the stored optimal values for a block size parameter associated with the memory device in performing the one or more regular tasks involving the memory device includes determining, based on the mode of the standard, the stored optimal value for the block size parameter from a plurality of block size parameters.

12. The method of claim 1, wherein the using the stored optimal values for a block size parameter associated with the memory device in performing the one or more regular tasks involving the memory device includes determining the stored optimal value for the block size parameter from a plurality of block size parameters.

13. At least one non-transitory computer-readable medium having computer-executable instructions stored thereon that, when executed, cause at least one computing device to:

establish a data connection with a memory device, the memory device adhering to a common standard as the at least one computing device;

determine whether the memory device is recognized or not and upon determining that the memory device is not recognized:

(i) perform a first write operation of a plurality of write operations to the memory device using a first block size;

(ii) perform a second write operation of the plurality of write operations to the memory device using a second block size different from the first block size, wherein the first block size and the second block size are included in a sweep pattern of different block sizes, the sweep pattern determined based on at least one of: (a) the standard or (b) one or more modes of the standard;

(iii) determine an optimal value for a block size parameter associated with the memory device based at least in part on the plurality of write operations; and (iv) store the optimal value for the block size parameter associated with the memory device, the stored optimal value associated with the memory device retrievable upon recognition of the memory device; and use a stored optimal value for a block size parameter associated with the memory device in performing one or more regular tasks involving the memory device, wherein a first optimal value is determined for a first mode of operation defined by the standard, and wherein a second optimal value is determined for a second mode of operation defined by the standard, the second mode being different from the first mode.

14. The at least one non-transitory computer-readable medium of claim 13, wherein determining an optimal value for the block size parameter is further based at least in part on a plurality of time values corresponding to the plurality of write operations, each time value of the plurality of time values representing an amount of time elapsed in completing a corresponding write operation.

15. The at least one non-transitory computer-readable medium of claim 14, wherein a block size used in the write operation corresponding to the smallest time value is selected as the optimal value for the block size parameter.

16. The at least one non-transitory computer-readable medium of claim 14, having additional computer-executable instructions stored thereon that, when executed, further cause the at least one computing device to:

estimate an amount of power consumption for each of the plurality of write operations, wherein a block size used in the write operation corresponding to the lowest amount of power consumption is selected as the optimal value for the block size parameter.

17. The at least one non-transitory computer-readable medium of claim 13, wherein the standard is SD (Secure Digital).

18. The at least one non-transitory computer-readable medium of claim 13, wherein the standard is e-MMC (Embedded MultiMediaCard).

19. The at least one non-transitory computer-readable medium of claim 13, wherein the standard is SATA (Serial Advanced Technology Attachment).

20. The at least one non-transitory computer-readable medium of claim 13, wherein the computer-executable instructions stored thereon, when executed, further causes the at least one computing device to:

obtain one or more optimization preferences for specifying which properties are to be prioritized or maximized to achieve at least one desired type of optimized performance; and perform the determining of the optimal value for the block size parameter, based on the one or more optimization preferences.

21. An apparatus, comprising:

at least one processor;

a memory controller; and memory storing computer-readable instructions that, when executed by the at least one processor, cause the apparatus to:

establish, via the memory controller, a data connection with a memory device, the memory device adhering to a common standard as the memory controller;

determine whether the memory device is recognized or not and upon determining that the memory device is not recognized:

(i) perform a first write operation of a plurality of write operations to the memory device using a first block size;

(ii) perform a second write operation of the plurality of write operations to the memory device using a second block size, wherein the first block size and the second block size are included in a sweep pattern of different block sizes, the sweep pattern determined based on at least one of: (a) the standard or (b) one or more modes of the standard;

(iii) determine an optimal value for a block size parameter associated with the memory device based at least in part on the plurality of write operations; and (iv) store the optimal value for the block size parameter associated with the memory device, the stored optimal value associated with the memory device retrievable upon recognition of the memory device; and use a stored optimal value for a block size parameter associated with the memory device in performing one or more regular tasks involving the memory device, wherein a first optimal value is determined for a first mode of operation defined by the standard, and wherein a second optimal value is determined for a second mode of operation defined by the standard, the second mode being different from the first mode.

22. The apparatus of claim 21, wherein determining an optimal value for the block size parameter is further based at least in part on a plurality of time values corresponding to the plurality of write operations, each time value of the plurality of time values representing an amount of time elapsed in completing a corresponding write operation.

23. The apparatus of claim 22, wherein a block size used in the write operation corresponding to the smallest time value is selected as the optimal value for the block size parameter.

24. The apparatus of claim 22, wherein the memory stores additional computer-readable instructions that, when executed by the at least one processor, further cause the apparatus to:

estimate an amount of power consumption for each of the plurality of write operations, wherein a block size used in the write operation corresponding to the lowest amount of power consumption is selected as the optimal value for the block size parameter.

25. The apparatus of claim 21, wherein the standard is SD (Secure Digital).

26. The apparatus of claim 21, wherein the standard is e-MMC (Embedded MultiMediaCard).

27. The apparatus of claim 21, wherein the standard is SATA (Serial Advanced Technology Attachment).

28. The apparatus of claim 21, wherein the computer-readable instructions stored on the memory, when executed by the at least one processor, further causes the apparatus to:

obtain one or more optimization preferences for specifying which properties are to be prioritized or maximized to achieve at least one desired type of optimized performance; and perform the determining of the optimal value for the block size parameter, based on the one or more optimization preferences.

29. A system comprising:

means for establishing a data connection with a memory device, the memory device adhering to a common standard as a memory controller;

means for determining whether the memory device is recognized or not and upon determining that the memory device is not recognized:

(i) means for performing a first write operation of a plurality of write operations to the memory device using a first block size;

(ii) means for performing a second write operation of the plurality of write operations to the memory device using a second block size, wherein the first block size and the second block size are included in a sweep pattern of different block sizes, the sweep pattern determined based on at least one of: (a) the standard or (b) one or more modes of the standard;

(iii) means for determining an optimal value for a block size parameter associated with the memory device based at least in part on the plurality of write operations; and (iv) means for storing the optimal value for the block size parameter associated with the memory device, the stored optimal value associated with the memory device retrievable upon recognition of the memory device; and means for using a stored optimal value for a block size parameter associated with the memory device in performing one or more regular tasks involving the memory device, wherein a first optimal value is determined for a first mode of operation defined by the standard, and wherein a second optimal value is determined for a second mode of operation defined by the standard, the second mode being different from the first mode.

30. The system of claim 29, wherein determining an optimal value for the block size parameter is further based at least in part on a plurality of time values corresponding to the plurality of write operations, each time value of the plurality of time values representing an amount of time elapsed in completing a corresponding write operation.

31. The system of claim 30, wherein a block size used in the write operation corresponding to the smallest time value is selected as the optimal value for the block size parameter.

32. The system of claim 30, further comprising:

means for estimating an amount of power consumption for each of the plurality of write operations, wherein a block size used in the write operation corresponding to the lowest amount of power consumption is selected as the optimal value for the block size parameter.

33. The system of claim 29, wherein the standard is SD (Secure Digital).

34. The system of claim 29, wherein the standard is e-MMC (Embedded MultiMediaCard).

35. The system of claim 29, wherein the standard is SATA (Serial Advanced Technology Attachment).

36. The system of claim 29, further comprising:

means for obtaining one or more optimization preferences for specifying which properties are to be prioritized or maximized to achieve at least one desired type of optimized performance, and wherein the means for determining the optimal value for the block size parameter determines the optimal value for the block size parameter based on the one or more optimization preferences.

* * * * *